March 28, 1950     R. C. STACEY     2,502,181
DEVICE FOR USE IN LOADING AND UNLOADING FREIGHT CARS
Filed Jan. 18, 1947
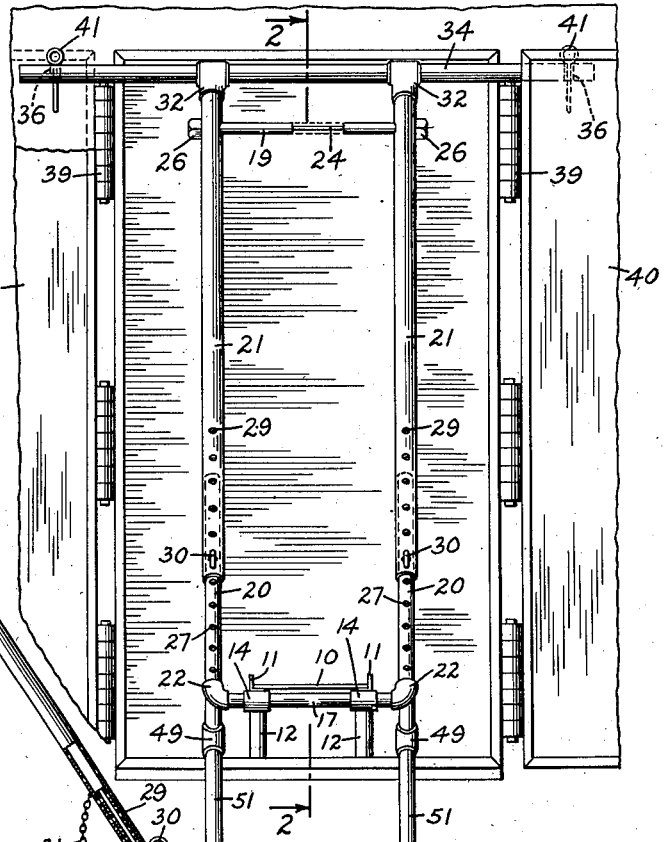
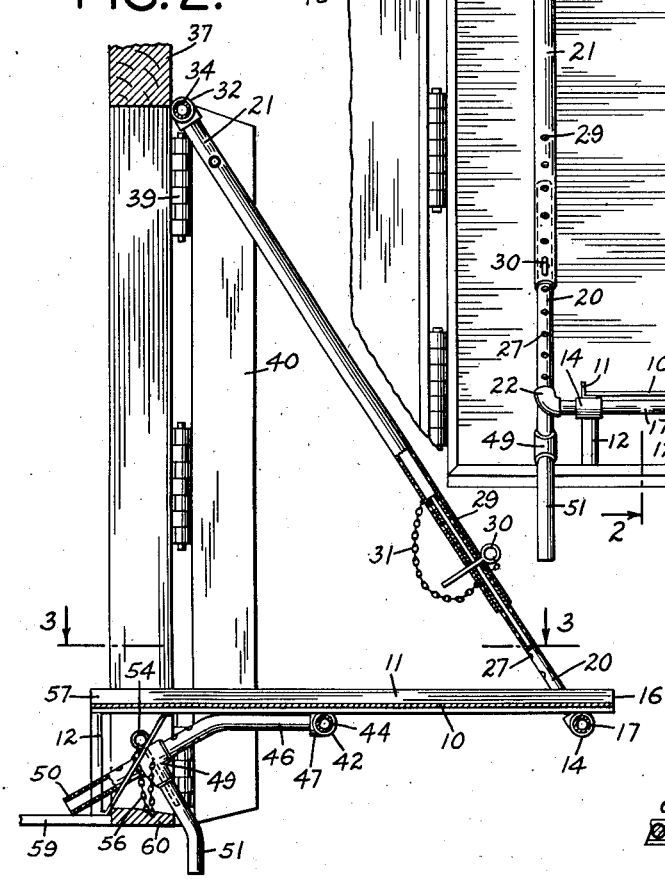
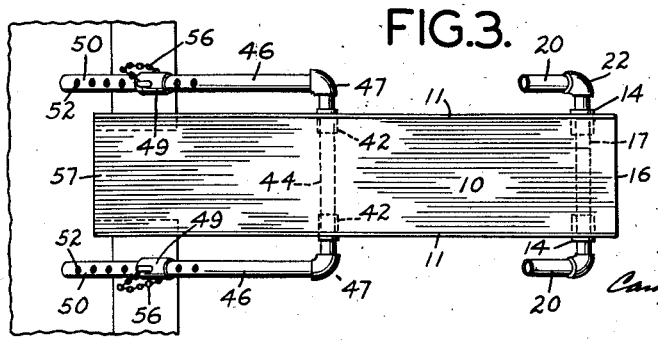
INVENTOR.
RICHARD C. STACEY
BY
HIS ATTORNEYS Patented Mar. 28, 1950

2,502,181

UNITED STATES PATENT OFFICE 2,502,181

DEVICE FOR USE IN LOADING AND UNLOADING FREIGHT CARS

Richard C. Stacey, Newark, N. J., assignor, by mesne assignments, to National Dairy Research Laboratories, Inc., New York, N. Y., a corporation of Delaware Application January 18, 1947, Serial No. 722,887

2 Claims. (Cl. 105—436)

1

The present invention relates to a device for loading and unloading vehicles such as freight cars and the like that is easily adjustable and capable of being attached to or removed from such vehicles without requiring any substantial changes in the construction thereof.

In the loading and unloading of freight cars, for example, from or to platforms, trucks and the like, it is customary to use relatively primitive means, such as a number of planks thrown across the opening between the doorsill of the freight car and the platform or truck to or from which articles of freight are transferred. This is particularly true when a freight car stands on a curved section of track inasmuch as the space between the loading platform and the doorsill of the freight car is thereby increased, thus making it hazardous for the loading personnel and affording a space through which articles of freight can easily be dropped.

Another disadvantage of the aforementioned primitive means of loading or unloading vehicles such as freight cars is that the deviation from the horizontal of the planks is determined entirely by the relative elevations of the platform or truck and the floor of the freight car. When, for example, the floor of the freight car is higher than the platform and it is desired to load the car with articles of freight, it is necessary for personnel to carry each article up the ramp. This inevitably increases the time required to load a freight car and is fatiguing and hazardous to the loading personnel.

One object of the present invention is to provide a ramp which can easily be adjusted for loading or unloading a freight car or the like without requiring the loading personnel to move across the space between the doorsill of the freight car and platform, truck or the like to transfer articles of freight over said space.

Another object of the invention is to provide an adjustable ramp which can easily be attached to and removed from a standard freight car or the like without requiring any change in its structure.

These and other objects, as well as the utility and advantages of the present invention will become apparent from the detailed description that follows and from the accompanying drawing wherein:

Figure 1 is an elevation illustrating one embodiment of the present invention;

Figure 2 is a section taken along section line 2—2 of Figure 1 looking in the direction of the arrows;

2

Figure 3 is a sectional plan view taken on section line 3—3 of Figure 2; and

Figure 4 is a segmental view in section illustrating schematically an alternative embodiment of the invention.

A ramp 10 provided with reenforcing side members 11 and, if desired, with foot members 12 is mounted upon one or more, and preferably two, pipe couplings 14 fixed to the underside of ramp 10. The outer end 16 of ramp 10 is supported by an extensible frame assembly comprising a lower spacer bar or pipe section 17 rotatably mounted in couplings 14, an upper spacer bar or pipe section 19 and a pair of telescopic suspension members comprising pipe sections 20 slidably mounted within pipe sections 21. Lower spacer bar 17 may be connected to pipe sections 20 by means of elbows 22 and upper spacer bar 19 may be connected by means of T's fitting over pipe sections 21 or, as shown, by means of a tie rod 24 secured by nuts 26. Pipe sections 20 are provided with a number of equidistantly spaced holes 27 and pipe sections 21 are provided with holes 29 also equidistantly spaced, but preferably at greater or lesser intervals than holes 27 so that at least one of each series of holes 27 and 29 will be in register for every relative position of pipe sections 20 and 21. Pipe sections 21 are provided with pins 30 adapted to be inserted through holes 27 and 29 of pipe sections 20 and 21, respectively, said pins 30 preferably, though not necessarily, being attached to pipe sections 21 by means of chains 31. The upper extremities of pipe sections 21 are attached to T's 32 that are slidably mounted upon a horizontal pipe section 34, preferably provided with a hole 36 adjacent each end. Horizontal pipe section 34 may, if desired, be permanently attached to the side 37 of a freight car or may simply be made to rest upon the upper hinges 39 supporting doors 40 of a freight car. Two pins 41 adapted to engage holes 36 at either end of horizontal pipe section 34 are preferably provided as a safety measure to prevent horizontal pipe section 34 from slipping longitudinally over and past either of the upper hinges 39.

At least one other, and preferably two, pipe couplings 42 are fixed to the underside of ramp 10 intermediate pipe couplings 14 and foot members 12. A U-frame comprising pipe section 44 and a pair of curved legs 46 is pivotally mounted in couplings 42. Curved legs 46 may suitably be attached to pipe section 44 by means of elbows 47 and are provided with T's 49 slidably mounted on arms 50 of curved legs 46. Hooked arms 51 are mounted in the upstanding openings of T's 49. Arms 50 are provided with a number of equally spaced holes 52 and T's 49, which are also perforated, are each provided with a pin 54 adapted ot engage holes 52 in arms 50 as well as the perforations in T's 49. Pins 54 may, if desired, be attached to T's 49 by means of chains 56.

In operation the loading device illustrated is attached to a freight car by simply placing horizontal pipe section 34 over hinges 39 and between side 37 and doors 40 of a freight car. Undue longitudinal movement of horizontal pipe section 34 is prevented by inserting pins 41 into holes 36. Pipe sections 20 are then telescoped into or out of pipe sections 21 until the platform end 16 of ramp 10 is at the desired elevation. When this has been accomplished, the relative positions of pipe sections 20 and 21 are fixed by inserting pins 30 through any holes 27 and 29 that happen to be in register. The extent of entry into the car of inner end 57 of ramp 10 is then adjusted by sliding T's 49 along arm 50 of curved leg 46 and, when the desired position has been found, pins 54 are inserted through the holes in T's 49 and the nearest registering hole 52 in arm 50.

If it is desired to remove the device from the side of a freight car, horizontal pipe section 34 is simply lifted off hinges 39 and the device is then free to be withdrawn. If, on the other hand, the loading device is to be retracted without removing it, end 57 of ramp 10 is simply raised so that the extensible frame assembly supporting outer end 16 of ramp 10 can swing downwardly until it is substantially parallel to the side of the freight car. Inner end 57 of ramp 10 can either be moved along floor 59 of the freight car so that upon adjustment of the combined lengths of pipe sections 20 and 21 ramp 10 will remain substantially horizontal or inner end 57 of ramp 10 can be raised so that ramp 10 will assume a position that is substantially vertical. In the latter event, curved leg 46, being pivotally mounted in pipe couplings 42, can continue to rest on floor 59 of the car.

Outer end 16 of ramp 10 can be raised or lowered simply by removing pins 30, decreasing or increasing, respectively, the combined lengths of pipe sections 20 and 21, and reinserting pins 30 into any two holes 27 and 29 that happen to be in register. Thus, for example, when it is desired to unload articles of freight from a freight car, it is desirable to increase the combined length of telescoping pipe sections 20 and 21 so that ramp 10 will slope downwardly toward the platform, truck or the like. If, on the other hand, the freight car is to be loaded with articles of freight, the combined length of telescopic pipe sections 20 and 21 is made shorter than shown in Figure 2 so that the articles of freight can slide or roll by gravity along ramp 10 and into the freight car. Hooked arms 51 are in abutment with sill 60 of the freight car and thus counteract the tendency of ramp 10 to slide into the freight car.

It is evident that numerous changes and alterations in the device specifically illustrated will occur to those skilled in the art upon reading the foregoing description. Thus, for example, the ramp may, as shown in Figure 4, advantageously be provided with a series of rollers 61 such as those employed in well known conveyor systems.

It is to be understood, therefore, that the present invention is not intended to be limited to the structure specifically described herein but is intended to include all such changes, alterations and modifications as come within the scope of the appended claims.

I claim:

1. A device for use in loading and unloading a freight car having hinged doors on the side which device comprises a substantially horizontal supporting member adapted to rest on the hinges of said doors and between said doors and the side of the freight car, a substantially rectangular frame pivotally suspended from said supporting member and comprising an upper spacer bar, a lower spacer and two telescopic suspension members, means for adjusting the lengths of said telescopic suspension members, a ramp having two ends, said ramp being pivotally mounted at one end upon said lower spacer bar and adapted to rest, at the other end, on the floor of the freight car when the ramp is in operative position, a U-frame pivotally attached to said ramp at a point intermediate the ends of the ramp, at least one leg of said U-frame being forked so that one arm of said fork will rest upon the floor of said freight car and the other arm will abut the door sill, and means for adjusting the relative lengths of said arms.

2. A device for use in loading and unloading a freight car having hinged doors on the side which device comprises a substantially horizontal supporting member adapted to rest on the hinges of said doors and between said doors and the side of said freight car, a substantially rectangular frame pivotally suspended from said supporting member and comprising an upper spacer bar, a lower spacer and two telescopic suspension members, means for adjusting the lengths of said telescopic suspension members, a ramp having two ends and provided with a series of conveyor rollers, said ramp being pivotally mounted at one end upon said lower spacer bar and adapted to rest, at the other end, on the floor of the freight car when the ramp is in operative position, a U-frame pivotally attached to said ramp at a point intermediate the ends of the ramp, at least one leg of said U-frame being forked so that one arm of said fork will rest upon the floor of said freight car and the other arm will abut the door sill, and means for adjusting the relative lengths of said arms.

RICHARD C. STACEY.

REFERENCES CITED

The following references are of record in the file of this patent:

UNITED STATES PATENTS

| Number | Name | Date |
| --- | --- | --- |
| 887,167 | Wilkes | May 12, 1908 |
| 1,034,061 | Benedict | July 30, 1912 |
| 1,380,229 | Manheim | May 31, 1921 |
| 2,177,525 | Henderson | Oct. 24, 1939 |